United States Patent
Ahn et al.

(10) Patent No.: US 11,496,709 B2
(45) Date of Patent: Nov. 8, 2022

(54) TERMINAL, OPERATING METHOD THEREOF, AND COMPUTER-READABLE RECORDING MEDIUM

(71) Applicant: Hyperconnect Inc., Seoul (KR)

(72) Inventors: Sang Il Ahn, Cheongju-si (KR); Yong Je Lee, Seoul (KR); Sung Joo Ha, Seongnam-si (KR)

(73) Assignee: Hyperconnect Inc., Seoul (KR)

( * ) Notice: Subject to any disclaimer, the term of this patent is extended or adjusted under 35 U.S.C. 154(b) by 0 days.

(21) Appl. No.: 17/161,893

(22) Filed: Jan. 29, 2021

(65) Prior Publication Data
US 2021/0243408 A1   Aug. 5, 2021

(30) Foreign Application Priority Data
Jan. 31, 2020   (KR) .................. 10-2020-0012270

(51) Int. Cl.
| | |
|---|---|
| *H04N 7/14* | (2006.01) |
| *G06N 20/00* | (2019.01) |
| *G06F 3/16* | (2006.01) |
| *G06T 5/00* | (2006.01) |

(52) U.S. Cl.
CPC ............ *H04N 7/147* (2013.01); *G06F 3/165* (2013.01); *G06N 20/00* (2019.01); *G06T 5/002* (2013.01); *G06T 2207/10016* (2013.01)

(58) Field of Classification Search
CPC ...................................................... H04N 7/14
See application file for complete search history.

(56) References Cited

U.S. PATENT DOCUMENTS

| | | | |
|---|---|---|---|
| 8,441,356 B1 | 5/2013 | Tedesco et al. | |
| 8,826,322 B2 | 9/2014 | Bliss et al. | |
| 9,792,710 B2 | 10/2017 | Kimura | |
| 10,084,988 B2 * | 9/2018 | Farrell | ............... A63F 13/352 |
| 10,127,195 B2 | 11/2018 | Bliss et al. | |
| 11,184,582 B2 | 11/2021 | Ahn et al. | |
| 11,206,362 B2 | 12/2021 | Ahn | |
| 11,252,374 B1 * | 2/2022 | Lichtenberg | ............. G06N 3/08 |

(Continued)

FOREIGN PATENT DOCUMENTS

| | | |
|---|---|---|
| JP | H0690279 A | 3/1994 |
| JP | 2004532581 A | 10/2004 |

(Continued)

OTHER PUBLICATIONS

Extended European Search Report for European Application No. 21154225.3, Search completed Apr. 20, 2021, dated Apr. 29, 2021, 7 Pgs.

(Continued)

*Primary Examiner* — Olisa Anwah
(74) *Attorney, Agent, or Firm* — KPPB LLP

(57) ABSTRACT

Disclosed are a terminal, an operating method thereof, and a computer-readable recording medium. The operating method includes establishing a video call session between a first terminal and a second terminal, receiving, by the second terminal, data obtained by the first terminal, sequentially storing, by the second terminal, the data received from the first terminal in a buffer size, performing, by the second terminal, a validity check on the data stored in the buffer, and processing, by the second terminal, the data in response to a result of the validity check.

19 Claims, 6 Drawing Sheets

(56) References Cited

U.S. PATENT DOCUMENTS

| | | | |
|---|---|---|---|
| 11,323,659 B2 | 5/2022 | Ahn et al. | |
| 2003/0028875 A1 | 2/2003 | Piotrowski | |
| 2008/0294439 A1 | 11/2008 | Kirby | |
| 2009/0041311 A1* | 2/2009 | Hundley | H04N 21/4223 348/E5.096 |
| 2009/0288131 A1 | 11/2009 | Kandekar et al. | |
| 2013/0234826 A1 | 9/2013 | Sekiguchi et al. | |
| 2016/0023116 A1* | 1/2016 | Wire | A63F 13/71 463/16 |
| 2017/0339081 A1 | 11/2017 | Beust | |
| 2018/0176641 A1 | 6/2018 | Yun et al. | |
| 2018/0309801 A1 | 10/2018 | Rathod | |
| 2018/0335908 A1 | 11/2018 | Kim et al. | |
| 2019/0188453 A1 | 6/2019 | Ahn et al. | |
| 2019/0342246 A1 | 11/2019 | Theriault et al. | |
| 2020/0335090 A1 | 10/2020 | Freed et al. | |
| 2021/0037271 A1 | 2/2021 | Bikumala | |
| 2022/0229488 A1 | 7/2022 | Akimoto et al. | |
| 2022/0239862 A1 | 7/2022 | Ahn et al. | |

FOREIGN PATENT DOCUMENTS

| | | |
|---|---|---|
| JP | 2008159034 A | 7/2008 |
| JP | 2011082694 A | 4/2011 |
| JP | 2011205243 A | 10/2011 |
| JP | 2012146209 A | 8/2012 |
| JP | 2013531923 A | 8/2013 |
| JP | 2016122975 A | 7/2016 |
| JP | 2020010158 A | 1/2020 |
| JP | 2020500488 A | 1/2020 |
| KR | 10-2019-0007934 A | 1/2019 |
| WO | 2018194243 A1 | 10/2018 |
| WO | 2018221824 A1 | 12/2018 |

OTHER PUBLICATIONS

Korean Office Action of KR 10-2020-0012270 dated Nov. 30, 2020.
Office Action for Japanese Patent Application No. 2021013320 dated Jan. 19, 2022, 6 pgs.
"Talking to Complete Strangers on Holla App! Awkward (i.e., Vid0)," Published Jul. 21, 2018, Available online at https://www.youtube.corn/watch?v=F9ddBJ4yJZA.

* cited by examiner

TERMINAL, OPERATING METHOD THEREOF, AND COMPUTER-READABLE RECORDING MEDIUM

CROSS-REFERENCE TO RELATED APPLICATION

This application claims priority to and the benefit of Korean Patent Application No. 2020-0012270, filed on Jan. 31, 2020, the disclosure of which is incorporated herein by reference in its entirety.

BACKGROUND

1. Field of the Invention

The present invention relates to a terminal, an operating method thereof, and a computer-readable recording medium and, more specifically, to a terminal that allows a video call user not to be exposed to an unpleasant environment, an operating method thereof, and a computer-readable recording medium.

2. Discussion of Related Art

With the development of communication technology and miniaturization of electronic devices, personal terminals are widely distributed to general consumers. In particular, recently, portable personal terminals such as smartphones or smart tablet computers are widely distributed. Most terminals have communication functions. Users may search the Internet or transmit or receive messages with other users using the terminals.

Further, with the development of small camera technology, small microphone technology, small display technology, and small speaker technology, most terminals, such as smartphones have a camera, a microphone, a display, and a speaker. A user may record a voice or capture a video including a voice using a terminal. The user may check a recorded voice through a speaker included in the terminal or check a captured video through a display.

Further, the user may share the recorded voice or the captured video with another user using a communication function of the terminal. The user may transmit a voice previously recorded or a video previously captured to another user. Further, the user may transmit a voice currently being recorded by the terminal or a video currently being captured to another user in real time.

Further, at the same time, another user may transmit a voice currently being recorded by his or her own terminal or a video currently being captured to the user in real time. The display included in the terminal of the user may simultaneously display the video currently being captured by the terminal of the user and the video currently being captured by the terminal of another user. Further, the speaker included in the terminal of the user may simultaneously play both of the voice currently being recorded by the terminal of the user and a voice currently being recorded by a terminal of another user. In other words, the user and another user may make a video call with each other using their own terminals.

When a user makes a video call with a counterpart, the user may be exposed to an inappropriate video or sound which is provided from the counterpart. In particular, while a user makes a video call with a counterpart in a relationship in which they do not know each other, there may be a high possibility that the user is exposed to obscene videos provided from the counterpart.

Various methods have been proposed to protect video call users from harmful environments. However, there is a need for a method of reliably blocking harmful elements while maintaining low latency in a process of transmitting or receiving data in real time.

SUMMARY OF THE INVENTION

The present invention is directed to providing a terminal that allows a video call user not to be exposed to a harmful environment, an operating method thereof, and a computer-readable recording medium.

According to an aspect of the present invention, there is provided an operating method of a terminal, which includes establishing a video call session between a first terminal and a second terminal, receiving, by the second terminal, data obtained by the first terminal, sequentially storing, by the second terminal, the data received from the first terminal in a buffer size, performing, by the second terminal, a validity check on the data stored in the buffer, and processing, by the second terminal, the data in response to a result of the validity check.

The method may further include decoding, by the second terminal, the data, and in the decoding of the data, the data for which the validity check is completed in the performing of the validity check may be decoded. Alternatively, the method may further include decoding, by the second terminal, the data, and in the performing of the validity check, the validity check may be performed on the data decoded in the decoding of the data stored in the buffer.

In the performing of the validity check, a machine learning model may be used to determine whether the data includes an improper element.

In the processing of the data, it may be determined not to play data including an improper element as a result of the validity check.

In the processing of the data, it may be determined to play alternative data for a period of time corresponding to the data including an improper element.

The data may include at least one of image data, audio data, and text data.

The performing of the validity check may include performing the validity check on a first data set stored in the buffer, performing the validity check on a second data set stored in the buffer, and performing the validity check on a third data set stored in the buffer. The first to third data sets may be data sets sequentially stored in the buffer.

As a result of performing the validity check, when it is determined that the first data set and the third data set do not include an improper element and the second data set includes an improper element, in the processing of the data, it may be determined to play the first data set and the third data set and not to play the second data set.

In the processing of the data, image data included in the second data set may be subjected to blurring or mosaic processing, audio data included in the second data set may be subjected to mute processing, and text data included in the second data set may not be displayed.

Meanwhile, there is provided a computer-readable recording medium on which a program for performing the operating method of the terminal according to the present invention is recorded.

According to still another aspect of the present invention, there is provided a terminal including a communication interface configured to establish a video call session between the terminal and another terminal and allow the terminal and another terminal to transmit or receive data to or from each other, a data storage unit configured to sequentially store data received from the another terminal through the video call session according to a time at which the data is received, a validity check unit configured to perform a validity check on the data stored in the data storage unit, and a control unit configured to process the data in response to a result of the validity check.

Further, the terminal may further include a decoder configured to decode the data, and the decoder may decode the data for which the validity check is completed in the validity check unit.

Further, the validity check unit may use a machine learning model to determine whether the data includes an improper element.

The control unit may determine not to play the data including an improper element as a result of the validity check.

The control unit may determine to play alternative data for a period of time corresponding to the data including the improper element.

The data may include at least one of image data, audio data, and text data.

The validity check unit may perform a validity check on a first data set, a second data set, and a third data set which are stored in the data storage unit, and the first to third data sets may be data sets sequentially stored in the data storage unit.

As a result of performing the validity check, when it is determined that the first data set and the third data set do not include an improper element and the second data set includes an improper element, the control unit may determine to play the first data set and the third data set and determines not to play the second data set.

The control unit may perform blurring or mosaic processing on image data included in the second data set, perform mute processing on audio data included in the second data set, and allow text data included in the second data set not to be displayed.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
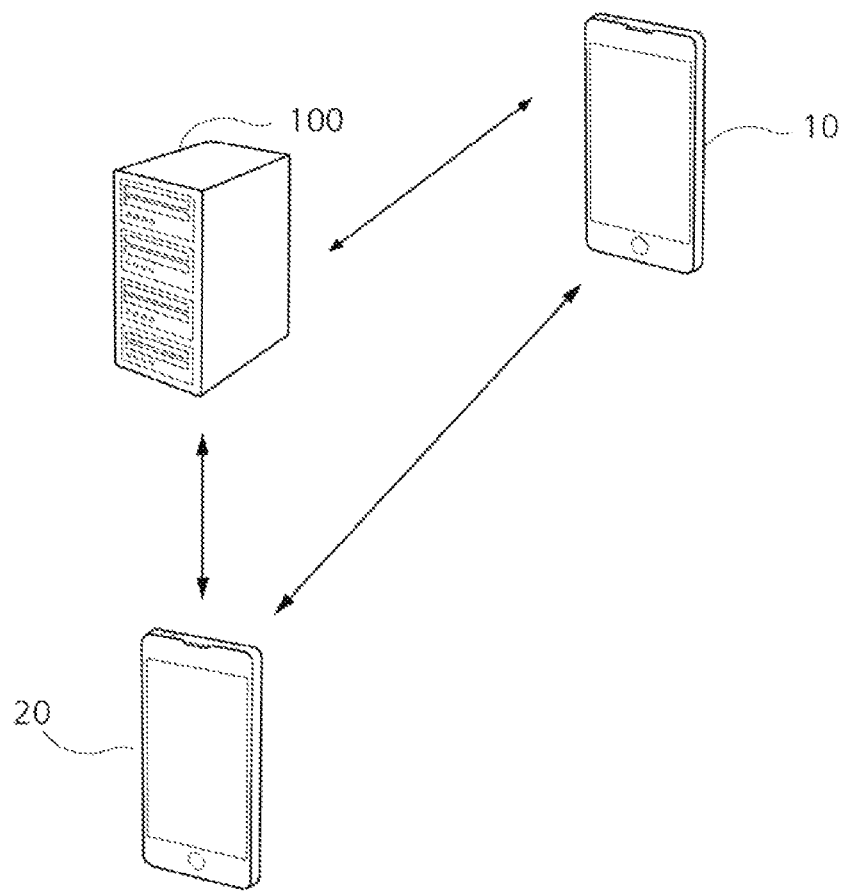
FIG. 1 is a schematic diagram illustrating an environment in which terminals operate according to the present invention.

Advantages and features of the present invention and methods of achieving the same will be clearly understood with reference to the accompanying drawings and embodiments described in detail below. However, the present invention is not limited to the embodiments to be disclosed below but may be implemented in various different forms. The embodiments are provided in order to fully explain the present embodiments and fully explain the scope of the present embodiments for those skilled in the art. The scope of the present embodiments is only defined by the appended claims. Like reference numerals refer to like elements throughout the specification.

It will be understood that, although the terms "first," "second," etc. may be used herein to describe various elements, these elements should not be limited by these terms. These terms are only used to distinguish one element from another. Therefore, a first element described below may be a second element within the technological scope of the present invention.

Terms used in this specification are considered in a descriptive sense only and not for purposes of limitation. In this specification, the singular forms include the plural forms unless the context clearly indicates otherwise. It will be understood that the terms "comprise" or "comprising," when used herein, specify some stated components, steps, operations and/or elements but do not preclude the presence or addition of one or more other components and operations.

Unless otherwise defined, all terms (including technical and scientific terms) used herein can be used as is customary in the art to which the present invention belongs. Also, it will be further understood that terms, such as those defined in commonly used dictionaries, will not be interpreted in an idealized or overly formal sense unless expressly so defined herein.

FIG. 1 is a schematic diagram illustrating an environment in which terminals operate according to the present invention. Referring to FIG. 1, an environment, in which a first terminal 10 and a second terminal 20 operate, may include a server 100, and the first terminal 10 and the second terminal 20 which are connected to the server 100. Descriptions of terminals according to the present invention may be replaced with descriptions of the first terminal 10 and the second terminal 20 illustrated in FIG. 1. For convenience of description, only two terminals, that is, the first terminal 10 and the second terminal 20, are illustrated in FIG. 1, but more than two terminals may be included. With respect to terminals that may be added, the descriptions of the first terminal 10 and the second terminal 20 may be applied, except for a description to be specifically described.

The server 100 may be connected to a communication network. The server 100 may be connected to other external devices via the communication network. The server 100 may transmit or receive data to or from another device connected thereto.

The communication network connected to the server 100 may include a wired communication network, a wireless communication network, or a complex communication network. The communication network may include a mobile communication network using third-generation (3G) communication, Long-Term Evolution (LTE) communication, LTE Advance (LTE-A) communication, or the like. The communication network may include a wired or wireless communication network using Wi-Fi, Universal Mobile Telecommunications System (UMTS) and/or General Packet Radio Service (GPRS), Ethernet, or the like. The communication network may include a short-range communication network using magnetic secure transmission (MST), radio frequency identification (RFID), near field communication (NFC), Zigbee, Z-Wave, Bluetooth, Bluetooth Low Energy (BLE), infrared (IR) communication, or the like. The communication network may include a local area network (LAN), a metropolitan area network (MAN), a wide area network (WAN), or the like.

The server 100 may receive data from at least one of the first terminal 10 and the second terminal 20. The server 100 may perform an operation using the data received from at least one of the first terminal 10 and the second terminal 20. The server 100 may transmit a result of the operation to at least one of the first terminal 10 and the second terminal 20.

The server 100 may receive a relay request from at least one of the first terminal 10 and the second terminal 20. The server 100 may select the terminal that transmits the relay request. For example, the server 100 may select the first terminal 10 and the second terminal 20.

The server 100 may relay a communication connection between the selected first and second terminals 10 and 20. For example, the server 100 may relay a video call connection between the first terminal 10 and the second terminal 20 or relay a transmission or reception connection for text. The server 100 may transmit connection information about the first terminal 10 to the second terminal 20 and transmit connection information about the second terminal 20 to the first terminal 10.

The connection information about the first terminal 10 may include, for example, an Internet protocol (IP) address and a port number of the first terminal 10. When the first terminal 10 receives the connection information about the second terminal 20, the first terminal 10 may attempt to connect to the second terminal 20 using the received connection information.

When the connection attempt of the first terminal 10 to the second terminal 20 or the connection attempt of the second terminal 20 to the first terminal 10 is successful, a video call session may be established between the first terminal 10 and the second terminal 20. The first terminal 10 may transmit a video or a sound to the second terminal 20 through the video call session. The first terminal 10 may encode the video or the sound as a digital signal and transmit the encoded result to the second terminal 20.

Further, the first terminal 10 may receive a video or a sound from the second terminal 20 through the video call session. The first terminal 10 may receive a video or a sound which is encoded as a digital signal and decode the received video or sound.

The second terminal 20 may transmit the video or the sound to the first terminal 10 through the video call session. Further, the second terminal 20 may receive the video or the sound from the first terminal 10 through the video call session. Accordingly, a user of the first terminal 10 and a user of the second terminal 20 may make a video call with each other.

Each of the first terminal 10 and the second terminal 20 may include, for example, a desktop computer, a laptop computer, a smartphone, a smart tablet computer, a smart watch, a mobile terminal, a digital camera, a wearable device, a portable electronic device, or the like. The first terminal 10 and the second terminal 20 may execute programs or applications. Each of the first terminal 10 and the second terminal 20 may be the same type of device or may be different types of devices.

Figure 2:
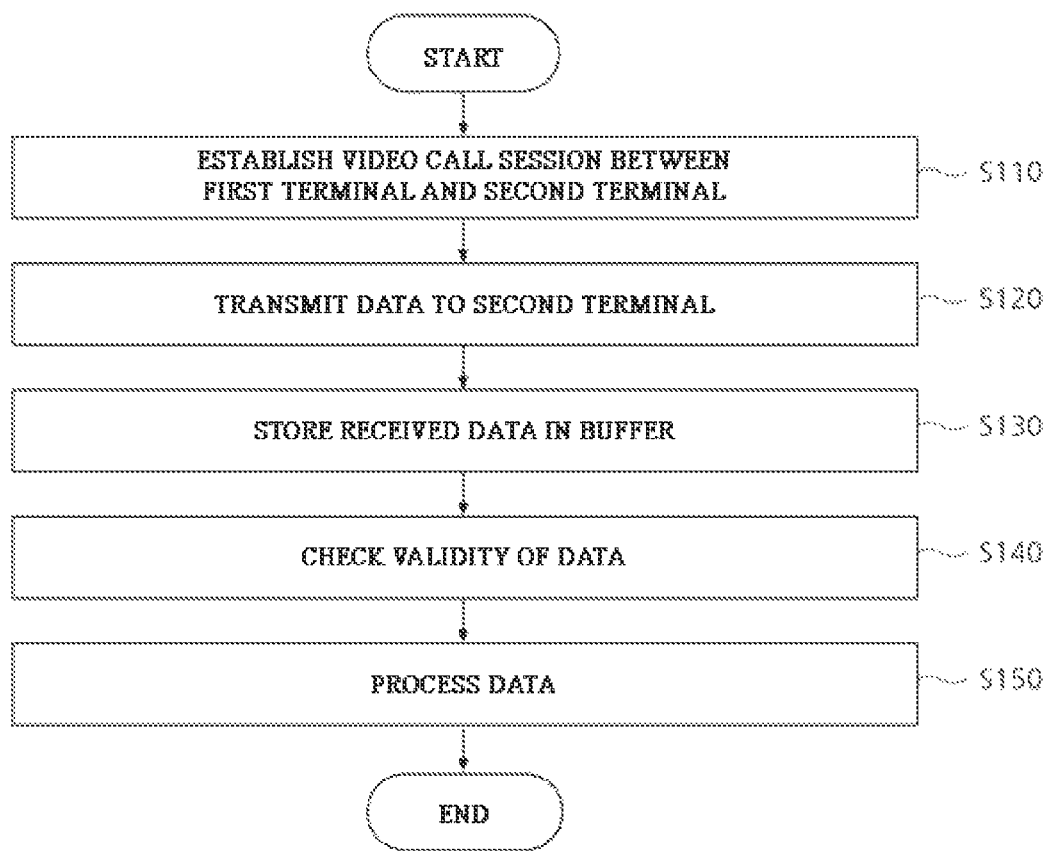
FIG. 2 is a flowchart schematically illustrating an operating method of a terminal according to an embodiment of the present invention.

FIG. 2 is a flowchart schematically illustrating an operating method of a terminal according to an embodiment of the present invention.

Referring to FIG. 2, the operating method of the terminals according to the embodiment of the present invention includes establishing a video call session between a first terminal and a second terminal (S110), transmitting data to the second terminal (S120), storing received data in a buffer (S130), checking a validity of the data (S140), and processing the data (S150).

In operation S110, a video call session is established between two terminals, that is, the first terminal 10 and the second terminal 20. The video call session may be established by the server 100 described with reference to FIG. 1 or may be actively established by the first terminal 10 and the second terminal 20.

In operation S120, the data obtained by the first terminal 10 is transmitted to the second terminal 20. The first terminal 10 and the second terminal 20 transmit or receive the data to or from each other through the video call session. The data may include at least one of video, voice, and text. When data generated by the first terminal 10 is transmitted to the second terminal 20, the data generated by the first terminal 10 may be encoded and transmitted to the second terminal 20 and the encoded data may be decoded in the second terminal 20. When data generated by the second terminal 20 is transmitted to the first terminal 10, the data encoded by the second terminal 20 may be decoded in the first terminal 10.

In operation S130, the second terminal 20 sequentially stores data received from the first terminal 10 in a buffer size. For example, when the size of the buffer is preset to n bytes, the data received from the first terminal 10 may be stored in the buffer of the second terminal 20 in units of n bytes. When data having 10× n bytes are transmitted from the first terminal 10 to the second terminal 20 during a specific time interval, the data may be sequentially stored in the buffer in units of n bytes in the order in which the data are transmitted from the first terminal 10. Meanwhile, here, the size of the buffer may refer to a size of the entire buffer but may also refer to a size of a unit buffer storing received data.

Meanwhile, the size of the unit buffer may be determined to correspond to a predetermined period of time. For example, the size of the unit buffer may be determined as a size of the data corresponding to 1 ms. In this case, in the unit buffer, the data corresponding to 1 ms may be sequentially stored in the entire buffer in the order in which the data are received.

In operation S140, the second terminal 20 performs a validity check on data stored in the buffer. The validity check is to check whether the data received from the first terminal 10 is valid and includes checking a validity of the data itself and whether the data includes an improper element.

For example, the data may include at least one of image data, audio data, and text data. In operation S140, it may be checked whether the image data, the audio data, or the text data includes an improper element.

In an embodiment, in operation S140, it may be checked whether the image data included in the data includes an improper element corresponding to at least one of rude gestures, insulting gestures, racist gestures, sexual content, nudity, genitalia, sexual activity, unsanitary content, excreta, acts of excreting, antisocial content, misanthropic content, illegal activity, criminal activity, hate crime, acts of violence, acts of abuse, acts of self-harm, weapons, drugs, antisocial symbols, hateful content, threatening content, phobia-inducing content, and blood.

Further, in operation S140, it may be checked whether the audio data or text data included in the data includes an improper element corresponding to at least one of abusive, intimidatory, hateful, anti-social, misanthropic, sexual, criminal, and offensive statements. Alternatively, it may be checked whether the audio data included in the data includes at least one improper element among groaning, a gasping sound, screaming, and shrieking. As another example, it may be checked whether the audio data included in the data includes at least one improper element among a roaring sound, a gunfire sound, a vomiting sound, a hitting sound, a whipping sound, a knife sound, a swinging sound, a stabbing sound, a sawing sound, a grating sound, a creaking sound, a sound having a pitch greater than or equal to a specific threshold value, and a sound having a loudness greater than or equal to a specific threshold value.

Meanwhile, in another embodiment, in operation S140, a machine learning model may be used to determine whether the data includes an improper element. The machine learning model may be a neural network including at least two layers. The machine learning model may include an input layer and an output layer. The machine learning model may further include at least one hidden layer.

The machine learning model may be a classification model trained using at least one video, voice, or text and information on whether the at least one video, voice, or text includes the improper element. The machine learning model may use at least one feature point included in an arbitrary video, voice, or text as an input value. The machine learning model may predict whether the at least one feature point corresponds to the improper element.

The machine learning model may be trained using a deep learning algorithm. The machine learning model may include at least one of techniques of a deep neural network (DNN), a convolutional neural network (CNN), a recurrent neural network (RNN), a region-based convolutional neural network (R-CNN), a restricted Boltzmann machine (RBM), a deep belief network (DBN), and a deep Q-network.

The machine learning model may include a CNN. The machine learning model may include AlexNet, ZFNet, GoogLeNet, VGGNet, ResNet, Inception-ResNet, Inception-v2, Inception-v3, or Inception-v4.

In an embodiment, a subject that determines whether an improper element is included in the data received using the machine learning model may be the server 100 or the first terminal 10 or the second terminal 20 that receives the data. That is, the receiving terminal may determine whether the improper element is included in the data using the machine learning model.

Meanwhile, in another embodiment of the present invention, operation S140 may include performing a validity check on a first data set stored in the buffer, performing a validity check on a second data set stored in the buffer, and performing a validity check on a third data set stored in the buffer. Here, the first to third data sets may be data sets sequentially stored in the buffer.

Therefore, it may be understood that, after the video call session is established in operation S110, operations S120 to S150 are repeatedly performed on the data sets stored in the unit buffer.

When the video call session is established and the data transmission is consecutively performed between the first terminal 10 and the second terminal 20 in real time, the validity check may be consecutively performed on the data sets sequentially stored in the buffer. The data set for which the validity check is completed may proceed to operation S150, and the validity check may be performed on the data set stored after the corresponding data set.

In operation S150, the data is processed in response to a result of the validity check. In an embodiment, in operation S150, when it is determined that the data includes an improper element as a result of the validity check in operation S140, it may be determined not to play the corresponding data in the second terminal 20.

For example, the data sets sequentially stored in the buffer may be checked in the order in which the data are received, and it may be determined not to play the data including the improper element. When it is determined that the image data includes an improper element, the corresponding data may not be played through a display of the second terminal 20. When it is determined that the audio data includes an improper element, the corresponding data may not be played through a speaker of the second terminal 20.

When it is determined that $n^{th}$ stored data ($n^{th}$ data) includes an improper element, the $n^{th}$ data may not be played and a validity check may be performed on $(n+1)^{th}$ stored data ($(n+1)^{th}$ data). When it is determined that the $(n+1)^{th}$ data does not include an improper element, the $(n+1)^{th}$ data may be normally played in the second terminal 20 and a validity check may be performed on $(n+2)^{th}$ stored data ($(n+2)^{th}$ data). Whether the $(n+2)^{th}$ data is played may be determined in operation S150 according to the result of the validity check in operation S140.

Meanwhile, in operation S150, it may be determined to play alternative data for a period of time corresponding to the data including the improper element. For example, when it is determined that the image data includes an improper element, it may be determined to play the image data included in the previous data set or to play an image obtained by performing blurring or mosaic processing on the image data including the improper element as an alternative image. When it is determined that the audio data includes an improper element, the audio data included in the previous data set may be played or the audio data including the improper element may be muted. Alternatively, when it is determined that the text data includes an improper element, it may be determined not to play the corresponding text data or to display a message indicating that the improper element is included.

Figure 3:
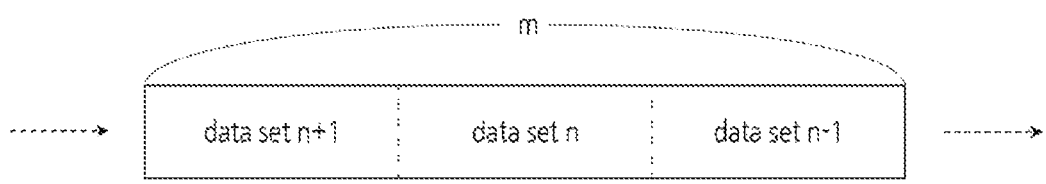
FIG. 3 is a schematic diagram illustrating an operation in which data is stored in a buffer according to an embodiment of the present invention.

FIG. 3 is a schematic diagram illustrating an operation in which data is stored in a buffer according to an embodiment of the present invention.

Referring to FIG. 3, data transmitted from a terminal of a counterpart connected through a video call session may be sequentially stored in a buffer of size m. In this case, the size m of the buffer may correspond to bytes of a predetermined size or to a predetermined time.

In FIG. 3, it may be understood that a $(n-1)^{th}$ data set (data set n−1), a $n^{th}$ data set (data set n), and a $(n+1)^{th}$ data set (data set n+1) are sequentially transmitted from the terminal of the counterpart.

A validity check may be sequentially performed on the $(n-1)^{th}$ data set (data set n−1) to the $(n+1)^{th}$ data set (data set n+1) stored in the buffer. The validity check corresponds to operation S140 described with reference to FIG. 2, and a data processing operation corresponding to operation S150 is performed on the data sets for which the validity check is completed.

When the buffer illustrated in FIG. 3 is the component included in the second terminal 20 described with reference to FIGS. 1 and 2, it may be understood that the $(n-1)^{th}$ data set (data set n−1) to the $(n+1)^{th}$ data set (data set n+1) are sequentially transmitted from the first terminal 10.

It may be understood that sizes of the $(n-1)^{th}$ data set (data set n−1) to the $(n+1)^{th}$ data set (data set n+1) are identical to each other. Alternatively, it may be understood that play times of the $(n-1)^{th}$ data set (data set n−1) to the $(n+1)^{th}$ data set (data set n+1) are also identical to each other.

That is, a space in which the $(n-1)^{th}$ data set (data set n−1) to the $(n+1)^{th}$ data set (data set n+1) are stored may be defined as each unit buffer included in the buffer, and data processing may be sequentially performed in a first in first out (FIFO) manner. The validity check and processing according to a result of the validity check may be sequentially performed on the data (or the data sets) stored in the buffer.

Figure 4:
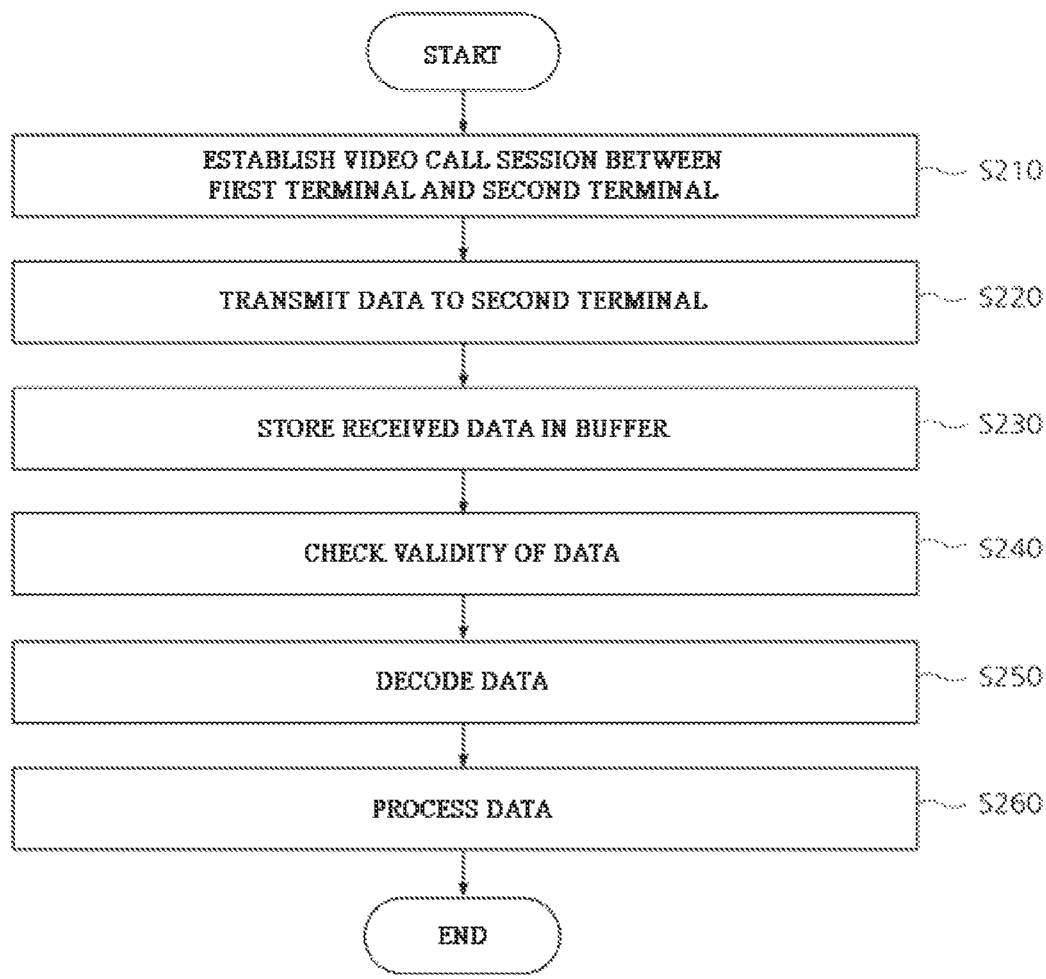
FIG. 4 is a flowchart schematically illustrating an operating method of a terminal according to another embodiment of the present invention.

FIG. 4 is a flowchart schematically illustrating an operating method of a terminal according to another embodiment of the present invention.

Referring to FIG. 4, the operating method of the terminal according to another embodiment of the present invention includes establishing a video call session between a first terminal and a second terminal (S210), transmitting data to the second terminal (S220), storing received data in a buffer (S230), performing a validity check on the data (S240), decoding the data (S250), and processing the data (S260). In the establishing of the video call session between the first terminal and the second terminal (S210), the transmitting of the data to the second terminal (S220), the storing of the received data in the buffer (S230), the performing of the validity check on the data (S240), and the processing of the data (S260), substantially the same operations as operations S110 to S150 described with reference to FIG. 2 are performed, and thus detailed descriptions thereof will not be repeated.

The data transmitted from the first terminal 10 is encoded as digital data and transmitted to the second terminal 20 in a compressed form. In operation S250, an operation of decoding the encoded data is performed. In operation S250, data decoding is performed on the data for which the validity check is completed, and in operation S260, data processing is performed in response to a result of the validity check. The data that does not go through the validity check in operation S240, that is, the data including the improper element, may not be decoded in operation S250.

In another embodiment, the validity check in operation S240 may be performed after the data is decoded. Accordingly, after the encoded data transmitted to the second terminal 20 is decoded, a validity check may be performed. The data for which the validity check is completed may be processed in operation S260 in response to a result of the validity check. After the data is decoded, the data that does not go through the validity check in operation S240, that is, the data including the improper element, may be processed in operation S260 so that the improper element is blocked for the user, such as by determining not to play the data or playing alternative data for a period of time corresponding to the data.

The second terminal 20 of the embodiment may sequentially store image data sets received from the first terminal 10 in the buffer and may perform a validity check on each data set according to the stored order. Meanwhile, in an embodiment, the second terminal 20 may decode the received image data sets and sequentially store the decoded image data sets in the buffer. However, it is possible to prevent inappropriate data from being played by determining whether to play the data according to the result of the validity check without determining whether to play the data immediately after the decoding. The second terminal 20 may determine whether to play the data sets according to the result of the validity check. In this way, it is possible to provide improved user convenience without the intervention of the server by performing a validity check for checking inappropriate elements of the received data sets using the machine learning model in each terminal.

Like a structure of the buffer of FIG. 3, the data decoding in operation S250 is performed in the order of being stored in the buffer, and when decoding for one piece of data (or one data set) is completed, the decoding is performed on data (or a data set) stored in the buffer after the decoding is performed on the corresponding data.

Figure 5:
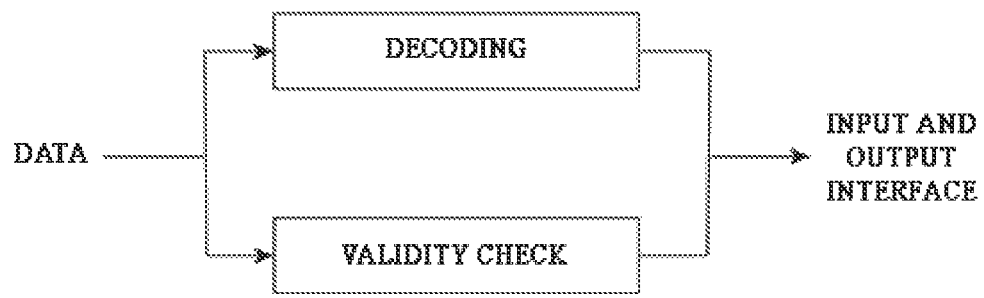
FIG. 5 is a schematic diagram illustrating an operating method of a terminal according to a related art.

FIG. 5 is a schematic diagram illustrating an operating method of a terminal according to a related art.

Referring to FIG. 5, in the terminal according to the related art, decoding and a validity check are simultaneously performed on received data. Since the decoding and the validity check are simultaneously performed on the same data, even when the data including an improper element is found, the decoded data may be transmitted to an input and output interface and displayed on the terminal of a user. Therefore, there is a problem in that even when playing of the data including the improper element stops, some pieces of corresponding data are inevitably exposed to the user.

In the terminal according to the related art, by simultaneously performing the decoding and the validity check, latency associated with data communication may be reduced but such a method is not desirable in terms of user health.

On the other hand, according to the operating method of the terminal according to the embodiment of the present invention, the decoding may not be performed on the data that does not go through the validity check, and even when the data is transmitted to the input and output interface, the data may not be displayed normally to the user. Therefore, it is possible to expect an effect of fundamentally blocking improper elements that may harm the user experience.

Figure 6:
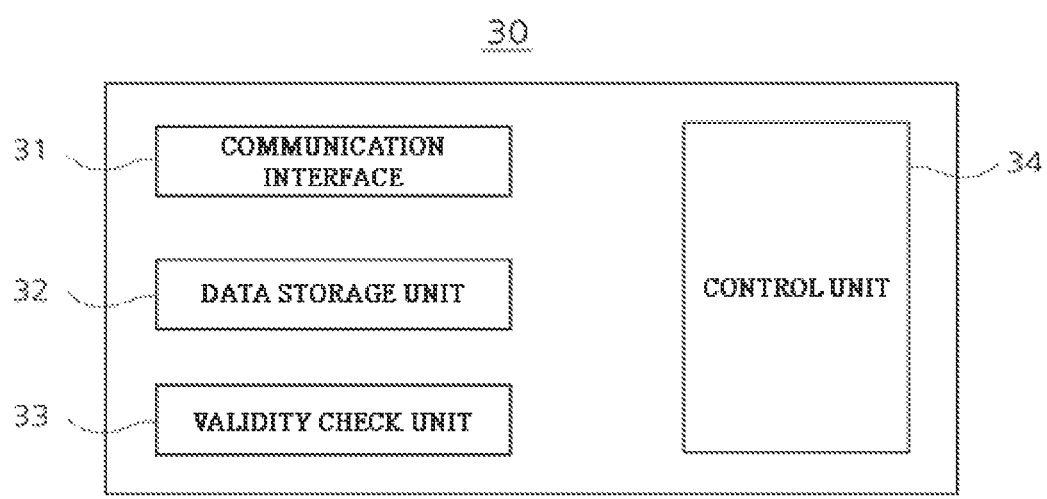
FIG. 6 is a schematic diagram illustrating a structure of a terminal according to an embodiment of the present invention.

FIG. 6 is a schematic diagram illustrating a structure of a terminal according to an embodiment of the present invention.

Referring to FIG. 6, a terminal 30 according to the embodiment of the present invention includes a communication interface 31, a data storage unit 32, a validity check unit 33, and a control unit 34. Each of the first terminal 10 and the second terminal 20 of FIG. 1 may include substantially the same components as the terminal 30 illustrated in FIG. 6. The control unit 34 includes at least one processor. The communication interface 31 includes at least one transceiver. The data storage unit 32 includes at least one memory. The validity check unit 33 includes at least one processor. Here, the at least one processor may be embodied as a various number of hardware, software and/or firmware structures that execute corresponding functions described herein.

The communication interface 31 may establish a video call session between the terminal 30 and another terminal and allow the terminal 30 to transmit or receive data to or from the another terminal. In the terminal 30, an application for executing a video call may be installed and the terminal 30 may make a video call with another terminal on which the same application is installed. The communication interface 31 may transmit a video call request from the terminal 30 to a terminal of a counterpart or receive a video call request from the terminal of the counterpart. In addition, the communication interface 31 may transmit information about the terminal 30 to the terminal of the counterpart or receive information about the terminal of the counterpart and may establish a video call session using the information about the terminals.

When the video call session is established, the communication interface 31 may transmit data obtained by the terminal 30 to the another terminal. The data may include at least one of video, a voice, and text. When the data generated by the terminal 30 is transmitted to the another terminal, the data generated by the terminal 30 may be encoded and transmitted to the another terminal and the encoded data may be decoded in the another terminal. When data generated by the another terminal is transmitted to the terminal 30, the data encoded by the another terminal may be decoded in the terminal 30. Therefore, the terminal 30 may further include a decoder for decoding encoded data. In addition, the decoder may perform decoding on the data for which a validity check is completed by the validity check unit 33. Alternatively, the decoder may transmit the decoded data to the validity check unit 33 to determine whether an improper element is included in the decoded data.

The data storage unit 32 sequentially stores data received from the another terminal in a buffer having a preset size. For example, when the size of the buffer is preset to n bytes, the data received from the another terminal may be stored in the buffer of the data storage unit 32 in units of n bytes. When the data having 10× n bytes are transmitted from the another terminal to the terminal 30 during a specific time interval, the data may be sequentially stored in the buffer in units of n bytes in the order in which the data are transmitted from the another terminal. Meanwhile, here, the size of the buffer may refer to a size of the entire buffer but may also refer to a size of a unit buffer storing received data.

Meanwhile, the size of the unit buffer may be determined to correspond to a predetermined period of time. For example, the size of the unit buffer may be determined as a size of data corresponding to 1 ms. In this case, in the unit buffer, the data corresponding to 1 ms may be sequentially stored in the entire buffer in the order in which the data are received.

The validity check unit 33 performs a validity check on the data stored in the data storage unit 32. The validity check is to check whether the data received from the another terminal is valid and includes checking a validity of the data itself and whether the data includes an improper element.

For example, the data may include at least one of image data, audio data, and text data, and the validity check unit 33 may check whether the image data, the audio data, or the text data includes an improper element.

In an embodiment, the validity check unit 33 may check whether the image data included in the data includes an improper element corresponding to at least one of rude gestures, insulting gestures, racist gestures, sexual content, nudity, genitalia, sexual activity, unsanitary content, excreta, acts of excreting, antisocial content, misanthropic content, illegal activity, criminal activity, hate crime, acts of violence, acts of abuse, acts of self-harm, weapons, drugs, antisocial symbols, hateful content, threatening content, phobia-inducing content, and blood.

Further, the validity check unit 33 may check whether the audio data or text data included in the data includes an improper element corresponding to at least one of abusive, intimidatory, hateful, anti-social, misanthropic, sexual, criminal, and offensive statements. Alternatively, it may be checked whether the audio data included in the data includes at least one improper element among groaning, a gasping sound, screaming, and shrieking. As another example, it may be checked whether the audio data included in the data includes at least one improper element among a roaring sound, a gunfire sound, a vomiting sound, a hitting sound, a whipping sound, a knife sound, a swinging sound, a stabbing sound, a sawing sound, a grating sound, a creaking sound, a sound having a pitch greater than or equal to a specific threshold value, and a sound having a loudness greater than or equal to a specific threshold value.

Meanwhile, in another embodiment, the validity check unit 33 may use a machine learning model to determine whether the data includes an improper element. The machine learning model may be a neural network including at least two layers. The machine learning model may include an input layer and an output layer. The machine learning model may further include at least one hidden layer.

The machine learning model may be a classification model trained using at least one video, voice, or text and information on whether the at least one video, voice, or text includes the improper element. The machine learning model may use at least one feature point included in an arbitrary video, voice, or the text as an input value. The machine learning model may predict whether the at least one feature point corresponds to the improper element.

The machine learning model may be trained using a deep learning algorithm. The machine learning model may include at least one of a DNN, a CNN, an RNN, an R-CNN, an RBM, a DBN, and a deep Q-network.

The machine learning model may be a CNN. The machine learning model may include AlexNet, ZFNet, GoogLeNet, VGGNet, ResNet, Inception-ResNet, Inception-v2, Inception-v3, or Inception-v4.

In this way, the validity check unit 33 may perform machine learning on the data received by the terminal 30 so that the terminal 30 itself, which is not the server, may determine whether an improper element is included in the data. Since the terminal 30 receiving the data performs a validity check, a result of the machine learning may vary for each terminal 30, which may be advantageous in providing a user-customized result.

Meanwhile, in another embodiment of the present invention, the validity check unit 33 may perform a validity check on a first data set to a third data set stored in the data storage unit 32. In this case, the first to third data sets refer to data sets sequentially stored in the data storage unit 32.

Therefore, after the video call session is established, the validity check is performed on a data set stored first in time in the data storage unit 32 in the order of being stored and the validity check is performed on the data sets stored thereafter.

When the video call session is established and the data transmission is consecutively performed between the terminal 30 and the another terminal in real time, the validity check may be consecutively performed on the data sets sequentially stored in the data storage unit 32. The data set for which the validity check is completed may undergo a data processing process, and the validity check may be performed on the data set stored after the corresponding data set.

In an embodiment, the validity check unit 33 may perform a validity check on the decoded data. For example, the data storage unit 32 may sequentially store encoded data received from another terminal, the decoder may sequentially decode the stored data, and the validity check unit 33 may perform a validity check on the decoded data. Alternatively, the data storage unit 32 may sequentially store decoded data, and the validity check unit 33 may perform a validity check on the decoded data sequentially stored in the data storage unit 32.

The control unit 34 processes the data in response to a result of the validity check. In an embodiment, when it is determined that the data includes an improper element as a result of the validity check in the validity check unit 33, the control unit 34 may determine not to play the corresponding data in the terminal 30.

For example, the data sets sequentially stored in the data storage unit 32 may be checked in the order in which the data are received, and it may be determined not to play the data including the improper element. When it is determined that the image data includes an improper element, the corresponding data may not be played through a display of the terminal 30. When it is determined that the audio data includes an improper element, the corresponding data may not be played through a speaker of the terminal 30. The display and the speaker may constitute an input and output interface (not illustrated) included in the terminal 30.

When it is determined that $n^{th}$ stored data ($n^{th}$ data) includes an improper element, the $n^{th}$ data may not be played and a validity check may be performed on $(n+1)^{th}$ stored data ($(n+1)^{th}$ data). When it is determined that the $(n+1)^{th}$ data does not include an improper element, the $(n+1)^{th}$ data may be normally played in the terminal 30 and a validity check may be performed on $(n+2)^{th}$ stored data ($(n+2)^{th}$ data). Whether the $(n+2)^{th}$ data is played may be determined in the control unit 34 according to a result of the validity check.

Meanwhile, the control unit 34 may determine to play alternative data for a period of time corresponding to the data including the improper element. For example, when it is determined that the image data includes an improper element, it may be determined to play the image data included in the previous data set or to play an image obtained by performing blurring or mosaic processing on the image data including the improper element as an alternative image. When it is determined that the audio data includes an improper element, the audio data included in the previous data set may be played or the audio data including the improper element may be muted. Alternatively, when it is determined that the text data includes an improper element, it may be determined not to play the corresponding text data or to display a message indicating that the improper element is included.

The embodiments described above may also be realized in the form of a recording medium including instructions executable by a computer, such as a program module executed by a computer. Computer-readable media may be any available media which may be accessed by the computer and include any one of volatile and non-volatile media and separable and non-separable media.

Further, the computer-readable media may include computer storage media. The computer storage media may include any one of volatile and non-volatile media and separable and non-separable media, which are implemented using any method or technology for the storage of information such as computer-readable instructions, data structures, program modules, or other pieces of data.

According to the present invention, a terminal that allows a video call user not to be exposed to a harmful environment, an operating method thereof, and a computer-readable recording medium can be provided.

The embodiments of the present invention have been described above with reference to the accompanying drawings. However, it should be understood by those skilled in the art that various modifications can be made without departing from the scope of the present invention and without changing essential features thereof. Therefore, the above-described embodiments should be considered in a descriptive sense only and not for purposes of limitation.

What is claimed is:

1. An operating method of a terminal, the method comprising:
   establishing a video call session between a first terminal and a second terminal;
   receiving, by the second terminal, encoded data obtained at the first terminal;
   sequentially storing, by the second terminal, the encoded data received from the first terminal in a buffer;
   performing, by the second terminal, a validity check on the encoded data stored in the buffer;
   processing, by the second terminal, the encoded data in response to a result of the validity check; and
   wherein the processing of the encoded data includes decoding the encoded data when the encoded data passes the validity check.

2. The method of claim 1, wherein the performing of the validity check includes performing the validity check on the encoded data.

3. The method of claim 1, further comprising sequentially storing the decoded data in the buffer.

4. The method of claim 1, wherein, in the performing of the validity check, a machine learning model is used to determine whether the encoded data includes an improper element.

5. The method of claim 1, wherein the processing of the encoded data comprises, determining not to play the encoded data including an improper element as a result of the validity check.

6. The method of claim 1, wherein the processing of the encoded data comprises, determining to play alternative data for a period of time corresponding to the encoded data including an improper element.

7. The method of claim 1, wherein the encoded data includes at least one of image data, audio data, and text data.

8. The method of claim 1, wherein the performing of the validity check includes:
   performing the validity check on a first encoded data set stored in the buffer;
   performing the validity check on a second encoded data set stored in the buffer; and
   performing the validity check on a third encoded data set stored in the buffer, and
   the first to third encoded data sets are data sets sequentially stored in the buffer.

9. The method of claim 8, wherein, as a result of the performing of the validity check, when it is determined that the first encoded data set and the third encoded data set do not include an improper element and the second encoded data set includes an improper element,
   the processing of the encoded data comprises, determining to play the first encoded data set and the third encoded data set and not to play the second encoded data set.

10. The method of claim 9, wherein, in the processing of the encoded data, image data included in the second encoded data set is subjected to blurring or mosaic processing, audio data included in the second encoded data set is subjected to mute processing, and text data included in the second encoded data set is not displayed.

11. A computer-readable recording medium on which a program for performing the method according to claim 1 is recorded.

12. A terminal comprising:
   a transceiver configured to establish a video call session between the terminal and another terminal and allow the terminal and another terminal to transmit or receive data to or from each other;
   a memory configured to sequentially store encoded data received from the another terminal through the video call session according to a time at which the encoded data is received;

a validity check processor configured to perform a validity check on the encoded data stored in the memory; and a control processor configured to process the encoded data in response to a result of the validity check, wherein the control processor comprises a decoder configured to decode the encoded data when the encoded data passes the validity check in the validity check processor.

13. The terminal of claim 12, wherein the validity check processor uses a machine learning model to determine whether the encoded data includes an improper element.

14. The terminal of claim 12, wherein, as a result of the validity check, the control processor determines not to play the encoded data including an improper element.

15. The terminal of claim 14, wherein the control processor determines to play alternative data for a period of time corresponding to the encoded data including the improper element.

16. The terminal of claim 12, wherein the encoded data includes at least one of image data, audio data, and text data.

17. The terminal of claim 12, wherein the validity check processor performs a validity check on a first encoded data set, a second encoded data set, and a third encoded data set which are stored in the memory, and the first to third encoded data sets are data sets sequentially stored in the memory.

18. The terminal of claim 17, wherein, as a result of performing the validity check, when it is determined that the first encoded data set and the third encoded data set do not include an improper element and the second encoded data set includes an improper element, the control processor determines to play the first encoded data set and the third encoded data set and determines not to play the second encoded data set.

19. The terminal of claim 18, wherein the control processor performs blurring or mosaic processing on image data included in the second encoded data set, performs mute processing on audio data included in the second encoded data set, and allows text data included in the second encoded data set not to be displayed.

* * * * *